April 22, 1958  C. N. CROSS  2,831,285
DISPLAY MOUNT AND EASEL
Filed June 14, 1956
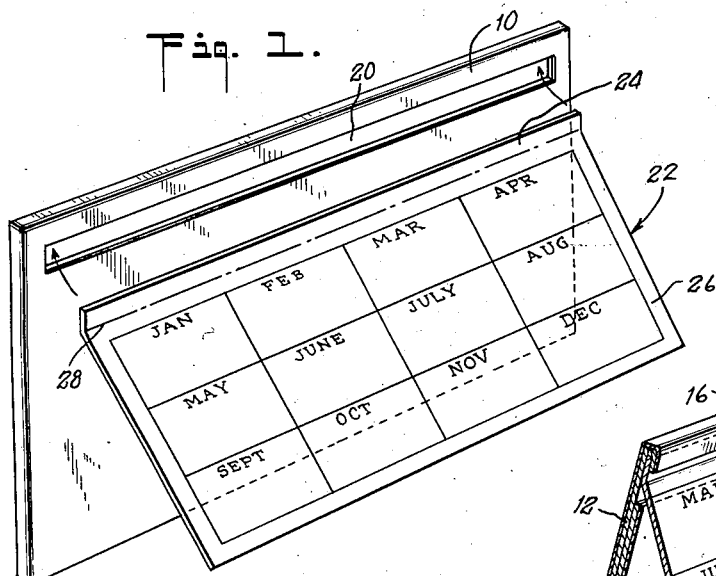
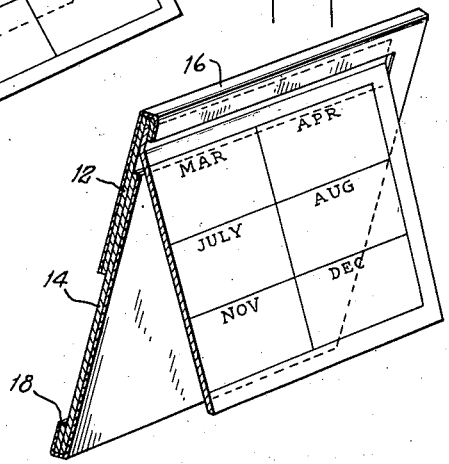
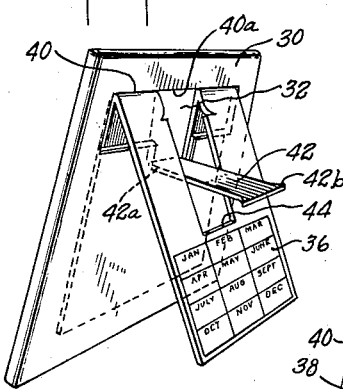
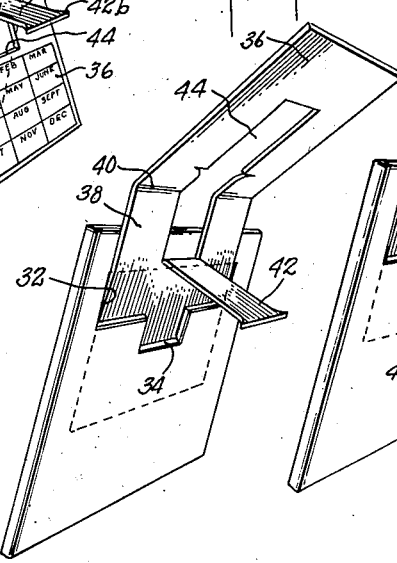
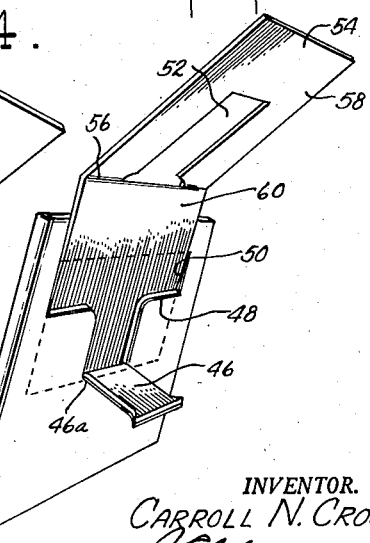
INVENTOR.
CARROLL N. CROSS
BY
ATTORNEY 2,831,285

Patented Apr. 22, 1958

2,831,285

DISPLAY MOUNT AND EASEL

Carroll N. Cross, Maitland, Fla.

Application June 14, 1956, Serial No. 591,336

4 Claims. (Cl. 40—152.1)

This invention relates to a mount for photographs or the like and more particularly to a mount structure having a separable supporting easel.

Mounts of the type involved here are frequently employed as an advertising medium. One face of the mount is adapted to carry photographs, month-by-month calendar pads, prints or other display material and the exposed face of the supporting easel is frequently imprinted with the calendar for the twelve months of the year. If an easel so imprinted is permanently attached to the mount body as by gluing, stapling, or otherwise, any excess stock on the shelves of a manufacturer or a distributor that is held over from one year to another represents a complete loss, since the calendar imprinted on the easel is outdated and this renders the entire held-over stock useless.

It is, therefore, the principal object of this invention to provide a display mount structure in which the supporting easel is a separable member so that if stock is carried from one year to the next, the easel may be removed and replaced by one bearing a current calendar.

It is a further object of the invention to provide a separable supporting easel for display mounts such that a plurality of easels can be die-cut and imprinted at a single operation which is not possible when dealing with easel structures which are attached to the mounts.

Other objects and advantages of the invention will become apparent as the description thereof proceeds in light of the drawing forming a part hereof, and in which drawing:

Figure 1 is a rear perspective view of a mount member and a separable easel leg therefor;

Fig. 2 is a sectional view of the display mount of Fig. 1, showing the supporting easel in operative position;

Fig. 3 is a rear perspective view of a modified form of the invention;

Fig. 4 is a view of the structure shown in Fig. 3, the leg of the easel having been raised to show the underlying structure; and Fig. 5 is a form of the invention modified still further to provide an easel locking tongue in the back board of the mount structure.

Figs. 1 and 2 illustrate the invention in its most elementary form. In this form of the invention, a mount member 10 is composed of a plurality of substantially coextensive cardboard members 12 and 14 disposed in face-to-face relation. For most constructions two such pieces of cardboard are sufficient. However, it may be found desirable to use three or even more pieces of cardboard in more elaborate constructions.

Whatever the number of cardboard pieces comprising the mount member, it is important that they be joined together in a unitary structure by some means which will permit some relative movement between the respective cardboard members. In other words, the cardboard members should not be glued in face-to-face relationship as frequently customary in such constructions. To the end that some relative movement may be permitted between the cardboard elements, the structure herein utilizes a flexible binding member 16 such as conventional leatherette stock which is a relatively thin paper substance to join the cardboard elements into a unitary structure. Thus, the flexible binding member 16 may extend about edges of the cardboards assembled in face-to-face relation and may be glued to the opposite exposed faces of the assembly.

The front face of the mount member constitutes a surface adapted to the mounting of display material such as photographs. The flexible binding material 16 and the face board 12 may be cut out to provide a recessed frame 18 for the display material.

The opposite or rear face of the mount assembly has provided therein a slot 20 which extends through the flexible binding material 16 and the rear cardboard element 14 of the mount assembly.

Adapted to cooperate with the slot 20 is a separable easel member 22 which comprises a base portion 24 and a leg portion 26 separated from each other by a flexible zone 28 which extends across the width of the easel and which will permit the base portion 24 and the leg portion 26 to rotate with reference to each other without danger of breaking. The zone 28 may be formed by scoring or alternate scoring and cutting through of the easel material, the easel preferably being formed of cardboard stock or cardboard stock covered with a flexible leatherette covering material.

The base 24 of the easel 22 is adapted for insertion through the slot 20 in the back of the mount structure and the base 24 is of such width as to extend between the face board 12 and the back 14 of the mount structure to an extent sufficient securely to hold the base portion 24 between the boards 12 and 14 of the mount structure by friction alone.

The fact that the cardboard elements such as 12 and 14 which comprise the mount member are secured only by the flexible binding material 16 not only permits sufficient separation of adjacent boards thereof to receive the base 24 of the easel 22, but the flexibility of the assembly effectively avoids warping of the mount portion such as inevitably would result from the strain imposed by the insertion of the base 24 of the easel member.

A somewhat modified form of the invention is shown in Figs. 3 and 4. The modified form of the invention in these figures is one which provides a locking tongue for the easel leg and yet retains the advantages stated in respect to that form of the invention shown in Fig. 1. Accordingly, the rear face of the mount member has provided therein a slot of somewhat greater width than that shown in the form of Fig. 1. Furthermore, the bottom edge on the slot is notched to accommodate an easel locking tongue when the separable easel member is placed in position.

Specifically, a mount member 30 is formed as taught in respect to the first form of the invention described and it has formed therein a slot 32 extending horizontally across the back of the mount member. The slot 32 has therein a notch 34 opening through the bottom edge of the slot 32. The easel designed to cooperate with the slot 32 comprises a leg portion 36 and a base portion 38, the base portion being substantially as long as the leg portion 36. The leg portion 36 and the base portion 38 are separated from each other by a flexible zone 40 which may be scored or otherwise rendered flexible enough to constitute a hinge line about which the leg and the base may rotate in respect to each other.

An easel locking tongue 42 is formed in the easel preferably simultaneously with the formation of the flexible line 40. The tongue 42 is attached to the base member at a score line 42a and is preferably of such length as to extend across the flexible line 40 into a locking slot 44 formed in the leg 36 of the easel. Thus, when the leg 36 and the base 38 of the easel are disposed in an angular relation to each other, as shown in Fig. 3, the tongue 42 will extend into that portion of the slot 44 formed in the leg portion 36, thus effectively latching the leg 36 in a mount supporting position.

Fig. 5 represents a modification of the structure shown in Figs. 3 and 4 to the extent that a locking tongue 46 is formed from the backboard 48 of the mount member. As seen in Fig. 5, this is done by cutting the backboard 48 along the spaced lines which extend through the lower edge of the slot 50. In this case, a latch slot 52 only is formed in the easel 54, this slot being preferably located entirely in the leg 58. This form of the invention provides an equally effective means for latching the easel leg in mount supporting position. It is merely necessary to insert the base 60 of the easel into the slot 50 whereby the base is securely held between two adjacent cardboard elements of the mount structure and then by rotating the locking tongue 46 outwardly about a score line 46a it is made to engage in the slot 52 of the easel leg to latch it in position.

The easel at the area of the hinge line is preferably substantially as wide as the length of the slot in the mount, whereby the easel to a large extent will conceal the raw cardboard edges defining the slot. In that form of the invention shown in Figs. 3–5, the hinge line of the easel is adapted to contact the upper wall of the slot in the back of the mount. The relationship not only effectively conceals the raw cardboard of the wall but also has the added advantage that support for the easel afforded by the slot wall greatly strengthens the connection between the mount and its easel and relieves the mount from much of the strain to which it might be subjected were it not for the abutting relationship. The arrangement is best shown in Fig. 3 in which the flexible line 40 is in contact with the wall 40a of the slot 32.

The latching function of the locking tongue 42 of Figs. 3 and 4 and the locking tongue 46 of Fig. 5 is rendered more effective for its purpose if it is cut on lines which diverge toward the base of the tongue. The slot 44 and the slot 52 of Figs. 4 and 5, respectively, are cut as a complement of the tongue so that when the tongues are engaged with their respective slots there will be a wedging action both when the leg is rotated toward the mount member and when the tongue is depressed to a lower point in the latch slot. The locking tongues may be somewhat enlarged at their free end, such as the end 42b in Figs. 3 and 4, to prevent displacement from the latch slot when the easel is erected. It may be seen, therefore, that the latch slot and locking tongue cooperate at an infinite number of points along the length thereof and thus afford the angular adjustment of the easel leg best suited to the reading of an imprint on its exposed face.

It will be seen from the foregoing that a separable easel structure has been provided which conforms to the objectives of the invention, the several embodiments herein being for purposes of illustration only since the scope of the invention will be defined in the claims that are to follow.

What is claimed is:

1. In a mount for photographs or the like, a mount member composed of a plurality of substantially coextensive cardboard members disposed in face-to-face relation, a flexible binding material secured to opposite faces of said mount member and extending about edges of said member whereby the cardboard members comprising said mount member are secured together into a unitary structure providing limited relative movement between the cardboard members thereof, a surface adapted to the mounting of photographs or the like at one face of said mount member, a slot having an upper edge extending through at least one of said cardboard members at the opposite face of said mount member, and a separable supporting easel for said mount member comprising a base portion and a leg portion substantially as long as said base portion separated from each other by a flexible zone extending across the width of said easel permitting said portions to rotate into face-to-face relation to each other, said base portion being insertable between a pair of adjacent cardboard members at said slot such that said base portion is frictionally held between a pair of said cardboard members and said flexible zone abuts the upper edge of said slot when said base portion and said leg portion are rotated into face-to-face relation, said leg portion having a latch slot therein, and a locking tongue adapted to engage in said latch slot to maintain said easel in mount supporting position.

2. In a mount for photographs or the like, a mount member composed of a plurality of substantially coextensive cardboard members disposed in face-to-face relation, a flexible binding material secured to opposite faces of said mount member and extending about edges of said member whereby the cardboard members comprising said mount member are secured together into a unitary structure providing limited relative movement between the cardboard members thereof, a surface adapted to the mounting of photographs or the like at one face of said mount member, a slot having an upper edge extending through at least one of said cardboard members at the opposite face of said mount member, and a separable supporting easel for said mount member comprising a base portion and a leg portion substantially as long as said base portion separated from each other by a flexible zone extending across the width of said easel permitting said portions to rotate into face-to-face relation to each other, said base portion being insertable between a pair of adjacent cardboard members at said slot such that said base portion is frictionally held between a pair of said cardboard members and said flexible zone abuts the upper edge of said slot when said base portion and said leg portion are rotated into face-to-face relation, said leg portion having a latch slot therein defined by edges that diverge in the direction of said base portion, and said base portion having formed therein a locking tongue one end of which is integral with said base portion and the free end of which has opposite edges adapted to engage edges of said latch slot.

3. In a mount for photographs or the like, a mount member composed of a plurality of substantially coextensive cardboard members disposed in face-to-face relation, a flexible binding material secured to opposite faces of said mount member and extending about edges of said member whereby the cardboard members comprising said mount member are secured together into a unitary structure providing limited relative movement between the cardboard members thereof, a surface adapted to the mounting of photographs or the like at one face of said mount member, a slot having an upper edge extending through at least one of said cardboard members at the opposite face of said mount member, and a separable supporting easel for said mount member comprising a base portion and a leg portion substantially as long as said base portion separated from each other by a flexible zone extending across the width of said easel permitting said portions to rotate into face-to-face relation to each other, said base portion being insertable between a pair of adjacent cardboard members at said slot such that said base portion is frictionally held between a pair of said cardboard members and said flexible zone abuts the upper edge of said slot when said base portion and said leg portion are rotated into face-to-face relation, said leg portion having a latch slot therein, and the slotted face of said mount member having formed therein a locking tongue adapted to engage in said latch slot to maintain said easel in mount supporting position.

4. In a mount for photographs or the like, a mount member composed of a plurality of substantially coextensive cardboard members disposed in face-to-face relation, a flexible binding material secured to opposite faces of said mount member and extending about edges of said member whereby the cardboard members comprising said mount member are secured together into a unitary structure providing limited relative movement between the cardboard members thereof, a surface adapted to the mounting of photographs or the like at one face of said mount member, a slot having an upper edge extending through at least one of said cardboard members at the opposite face of said mount member, and a separable supporting easel for said mount member comprising a base portion and a leg portion substantially as long as said base portion separated from each other by a flexible zone extending across the width of said easel permitting said portions to rotate into face-to-face relation to each other, said base portion being insertable between a pair of adjacent cardboard members of said slot such that said base portion is frictionally held between a pair of said cardboard members and said flexible zone abuts the upper edge of said slot when said base portion and said leg portion are rotated into face-to-face relation, said leg portion having a latch slot therein defined by edges that diverge in the direction of said base portion, and the slotted face of said mount member having formed therein a locking tongue one end of which is integral with said base portion and the free end of which has opposite edges adapted to engage edges of said latch slot.

References Cited in the file of this patent

UNITED STATES PATENTS

| | | |
|---|---|---|
| 547,377 | Gillbee | Oct. 1, 1895 |
| 1,359,662 | Blyth | Nov. 23, 1920 |